United States Patent
Yamamoto

(10) Patent No.: US 9,787,224 B2
(45) Date of Patent: Oct. 10, 2017

(54) MOTOR CONTROL APPARATUS EQUIPPED WITH PROTECTION OPERATION COMMAND UNIT

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/202,712

(22) Filed: Jul. 6, 2016

(65) Prior Publication Data
US 2017/0017209 A1    Jan. 19, 2017

(30) Foreign Application Priority Data
Jul. 17, 2015  (JP) .................................. 2015-143060

(51) Int. Cl.
  *H02P 3/02*    (2006.01)
  *H02P 27/06*   (2006.01)
  *H02P 29/024*  (2016.01)
  *H02H 7/09*    (2006.01)

(52) U.S. Cl.
  CPC ............... *H02P 3/02* (2013.01); *H02H 7/09* (2013.01); *H02P 27/06* (2013.01); *H02P 29/025* (2013.01)

(58) Field of Classification Search
  CPC ........... H02P 3/02; H02P 27/06; H02P 29/025
  USPC ................................................ 318/453, 452
  See application file for complete search history.

(56) References Cited

U.S. PATENT DOCUMENTS

| | | | | |
|---|---|---|---|---|
| 3,593,103 A | * | 7/1971 | Chandler | H02M 7/525 318/808 |
| 5,070,290 A | * | 12/1991 | Iwasa | H02P 23/06 187/288 |
| 6,657,322 B2 | * | 12/2003 | Skibinski | H02J 3/1842 307/105 |
| 7,135,833 B2 | * | 11/2006 | DeLange | G01J 1/04 318/727 |

(Continued)

FOREIGN PATENT DOCUMENTS

JP    200614546 A    1/2006

OTHER PUBLICATIONS

English Abstract for Japanese Publication No. 2006-014546 A, published Jan. 12, 2006, 2 pgs.

*Primary Examiner* — Rita Leykin
(74) *Attorney, Agent, or Firm* — Fredrikson & Byron, P.A.

(57) ABSTRACT

A motor control apparatus includes a rectifier which converts AC of a power source to DC, an inverter which converts DC to AC for a motor, a voltage amplitude calculation unit which calculates a power source voltage amplitude value, a power failure recovery detection unit which determines whether or not the AC input side has transitioned to a power failure state or a power recovery state on the basis of the power source voltage amplitude value, a protection operation command unit which outputs a protection operation command when a reference time has elapsed from a time point at which the AC input side transitioned to the power failure state, a time measurement unit which measures an elapsed time from when the AC input side transitioned to the power recovery state, and a condition change unit which changes the power failure reference voltage value and/or the reference time.

3 Claims, 5 Drawing Sheets

(56) References Cited

U.S. PATENT DOCUMENTS

| | | | |
|---|---|---|---|
| 7,138,777 B2* | 11/2006 | Won | H02P 6/34 |
| | | | 318/400.02 |
| 8,513,911 B2* | 8/2013 | Jones | B63H 21/17 |
| | | | 290/43 |
| 8,664,897 B2* | 3/2014 | Iwashita | H02P 3/14 |
| | | | 318/362 |
| 9,190,923 B2* | 11/2015 | Yuan | H02M 1/00 |
| 9,325,272 B2* | 4/2016 | Haugen | H02J 4/00 |
| 9,673,663 B2* | 6/2017 | Shiotani | H02J 9/061 |
| 2015/0219378 A1* | 8/2015 | Crane | F25B 49/022 |
| | | | 62/115 |

\* cited by examiner

VOLTAGE VECTOR ON
THREE-PHASE COORDINATE

THREE-PHASE-TO-TWO
-PHASE CONVERSION

VOLTAGE VECTOR IN
TWO-PHASE COORDINATE

MOTOR CONTROL APPARATUS EQUIPPED WITH PROTECTION OPERATION COMMAND UNIT

BACKGROUND OF THE INVENTION

1. Field of the Invention

The present invention relates to a motor control apparatus which converts alternating current (AC) power supplied from a three-phase AC input side into direct current (DC) power to output to a DC link, and then further converts the DC power into AC power for driving a motor, and in particular relates to the motor control apparatus including a protection operation command unit which commands the motor to perform a predetermined protection operation at the time of power failure on the three-phase AC input side.

2. Description of the Related Art

In motor control apparatuses for driving motors in machine tools, forging machines, injection molding machines, industrial machines, or various robots, AC power supplied from a three-phase AC input side is once converted into DC power and then further converted into the AC power to be used as drive power for a motor provided for each driving axis. Motor control apparatuses include a rectifier which rectifies AC power supplied from the three-phase AC input side and outputs DC power and an inverter which is connected to a DC link on a DC side of the rectifier and mutually converts the power between the DC power of the DC link and the AC power which is drive power or regenerative power of the motor, and they control a speed, torque, or a position of a rotor of the motor connected to an AC side of the inverter.

In such a motor control apparatus, when power failure occurs on the three-phase AC input side of the rectifier and a three-phase AC input voltage is decreased, the motor is not able to continue a normal operation. Thus, a failure may occur such as breakage and deformation of the motor, the motor control apparatus for driving the motor, a tool connected to the motor driven by the motor control apparatus, a machining target machined by the tool, a manufacturing line including the motor control apparatus, and the like. Therefore, a power failure detection unit is provided on the three-phase AC input side of the rectifier to monitor whether power failure occurs or not on the three-phase AC input side of the rectifier, and when the power failure detection unit determines that the power failure has occurred on the three-phase AC input side of the rectifier, the motor control apparatus performs a protection operation to avoid or minimize the above-described failure.

As a power failure detection method, for example, there is a method as described in Japanese Unexamined Patent Publication No. 2006-14546 in which a three-phase AC input voltage of an AC power source side of a rectifier is converted into an equivalent voltage vector in a two-phase coordinate by performing coordinate transformation, a power source voltage amplitude value is calculated by calculating an amplitude of the vector, and power failure is detected when a state in which the amplitude value is below a predetermined reference voltage value continues for a predetermined reference time length.

FIG. 6 illustrates the power failure detection method according to the invention described in Japanese Unexamined Patent Publication No. 2006-14546. A motor control apparatus 101 includes a rectifier 111 which rectifies AC power supplied from a three-phase AC input power source 103 and outputs DC power and an inverter 112 which is connected to a DC link as a DC side of the rectifier 111 and converts the DC power output from the rectifier 111 into AC power of a desired voltage or a desired frequency to be supplied as drive power of a motor 102 or converts the AC power regenerated from the motor 102 into the DC power, and the apparatus controls a speed, torque, or a position of a rotor of the motor 102 connected to the AC side of the inverter 112. An AC reactor 121 is disposed on the three-phase AC input side of the rectifier 111, and a smoothing capacitor 122 is disposed on the DC link which is on the DC output side of the rectifier 111. A voltage amplitude calculation unit 114 calculates a power source voltage amplitude value from an AC voltage value on the three-phase AC input side of the rectifier 111 detected by an AC voltage detection unit 113. A power failure detection unit 115 determines that power failure has occurred on the AC input side of the rectifier 111 when a state in which the power source voltage amplitude value is below a predetermined specified voltage value continues for a specified time. When the power failure detection unit 115 detects power failure, the inverter 112 is notified of a protection operation start command.

A protection operation to be performed when power failure occurs has an advantage that can protect the motor, the motor control apparatus, a tool, a machining target, a manufacturing line including the motor control apparatus, and the like, however, once the protection operation is executed, the manufacturing line is stopped which causes an economic loss in reality. It is not preferable to perform the protection operation in a case of power failure which occurs suddenly, does not last long, and is recovered immediately (hereinbelow, referred to as "instantaneous power failure"). Thus, the motor control apparatus and peripheral devices thereof (e.g. a control power source unit and a coolant device) are each provided with an energy storage unit such as a capacitor so as to be able to continue a normal operation for a certain period of time using energy stored therein when an instantaneous power failure occurs, and execution of the protection operation is suppressed to a necessary minimum. An energy amount enabling the motor control apparatus and the peripheral devices thereof to continue the normal operations when the instantaneous power failure occurs is referred to as "instantaneous power failure tolerance". After recovery from the instantaneous power failure, it is necessary to store the above-described energy for continuing the normal operation again in the energy storage unit to prepare for future power failure. The above-described specified voltage value and specified time used as power failure determination conditions of the power failure detection unit are generally determined in response to the instantaneous power failure tolerance. Energy for performing the protection operation at the time of power failure is less than the energy enabling the motor control apparatus and the peripheral devices thereof to continue the normal operation when the instantaneous power failure occurs and also supplied from the energy storage unit.

When the power failure on the three-phase AC input side of the rectifier (i.e., the AC power source side on which the three-phase AC input power source exists) is a single instantaneous power failure, energy can be sufficiently stored in the energy storage unit up to the instantaneous power failure tolerance enabling the motor control apparatus and the peripheral devices thereof to continue the normal operation. However, when the instantaneous power failure successively occurs, it is not able to sufficiently store the energy up to the instantaneous power failure tolerance, and the motor control apparatus and the peripheral devices thereof are not able to continue the normal operation itself. In such a case, when the power failure is detected thereafter, the protection operation is not able to be executed because of lack of energy, and accordingly, a failure may occur such as breakage and deformation of the motor, a motor control apparatus for driving the motor, a tool connected to the motor driven by the motor control apparatus, a machining target machined by the tool, a manufacturing line including the motor control apparatus, and the like.

If power failure detection sensitivity of the power failure detection unit is increased so that the protection operation is inevitably executed when the instantaneous power failure occurs regardless of single or successive, occurrence of the above-described failure such as breakage and deformation can be avoided, but an economic loss may occur due to stop of the manufacturing line as a result of execution of the protection operation, which is not efficient.

SUMMARY OF INVENTION

In view of the above problems, an object of the present invention is to provide a motor control apparatus capable of efficiently performing a protection operation when power failure occurs on a three-phase AC input side.

In order to achieve the object above, the motor control apparatus includes a rectifier configured to rectify alternating current (AC) power supplied from a three-phase AC input side to output direct current (DC) power, an inverter connected to a DC link on a DC output side of the rectifier and configured to convert power between DC power of the DC link and AC power as drive power or regenerative power of a motor, an AC voltage detection unit configured to detect an AC voltage value on the three-phase AC input side of the rectifier, a voltage amplitude calculation unit configured to calculate a power source voltage amplitude value from the AC voltage value, a power failure recovery detection unit configured to determine that the three-phase AC input side of the rectifier has transitioned from the power recovery state to a power failure state when the power source voltage amplitude value becomes a value less than or equal to a power failure detection reference voltage value from a value greater than the power failure detection reference voltage value in a power recovery state, and to determine that the three-phase AC input side of the rectifier has transitioned from the power failure state to the power recovery state when the power source voltage amplitude value becomes a value greater than or equal to a power recovery detection reference voltage from a value less than the power recovery detection reference voltage value in the power failure state, a protection operation command unit configured to output a protection operation command to the inverter to output power for the motor to perform a predetermined protection operation when a protection operation reference time has elapsed from a time point at which the power failure recovery detection unit determined that the three-phase AC input side of the rectifier had transitioned from the power recovery state to the power failure state, a time measurement unit configured to measure an elapsed time from a time point at which the power failure recovery detection unit determines that the three-phase AC input side of the rectifier is shifted from the power failure state to the power recovery state; and a condition change unit configured to change at least one of the power failure detection reference voltage value and the protection operation reference time in response to the elapsed time.

The condition change unit may include a power failure detection condition change unit configured to, when the elapsed time is less than a condition change reference time, change the power failure detection reference voltage value from a first specified voltage value used as the power failure detection reference voltage value to a second specified voltage value greater than the first specified voltage value and smaller than the power recovery detection reference voltage value, and when the elapsed time becomes greater than or equal to the condition change reference time, change the power failure detection reference voltage value from the second specified voltage value to the first specified voltage value.

Further, the condition change unit may include a protection operation condition change unit configured to, when the elapsed time is less than the condition change reference time, change the protection operation reference time from a first specified time used as the protection operation reference time to a second specified time shorter than the first specified time, and when the elapsed time becomes greater than or equal to the condition change reference time, change the protection operation reference time from the second specified time to the first specified time.

BRIEF DESCRIPTION OF THE DRAWINGS

The present invention will be more clearly understood with reference to the attached drawings, in which.

DETAILED DESCRIPTION

A motor control apparatus equipped with a protection operation command unit will be described below with reference to the drawings. However, it should be understood that the present invention is not limited to the drawings or the embodiments described below.

Figure 1:
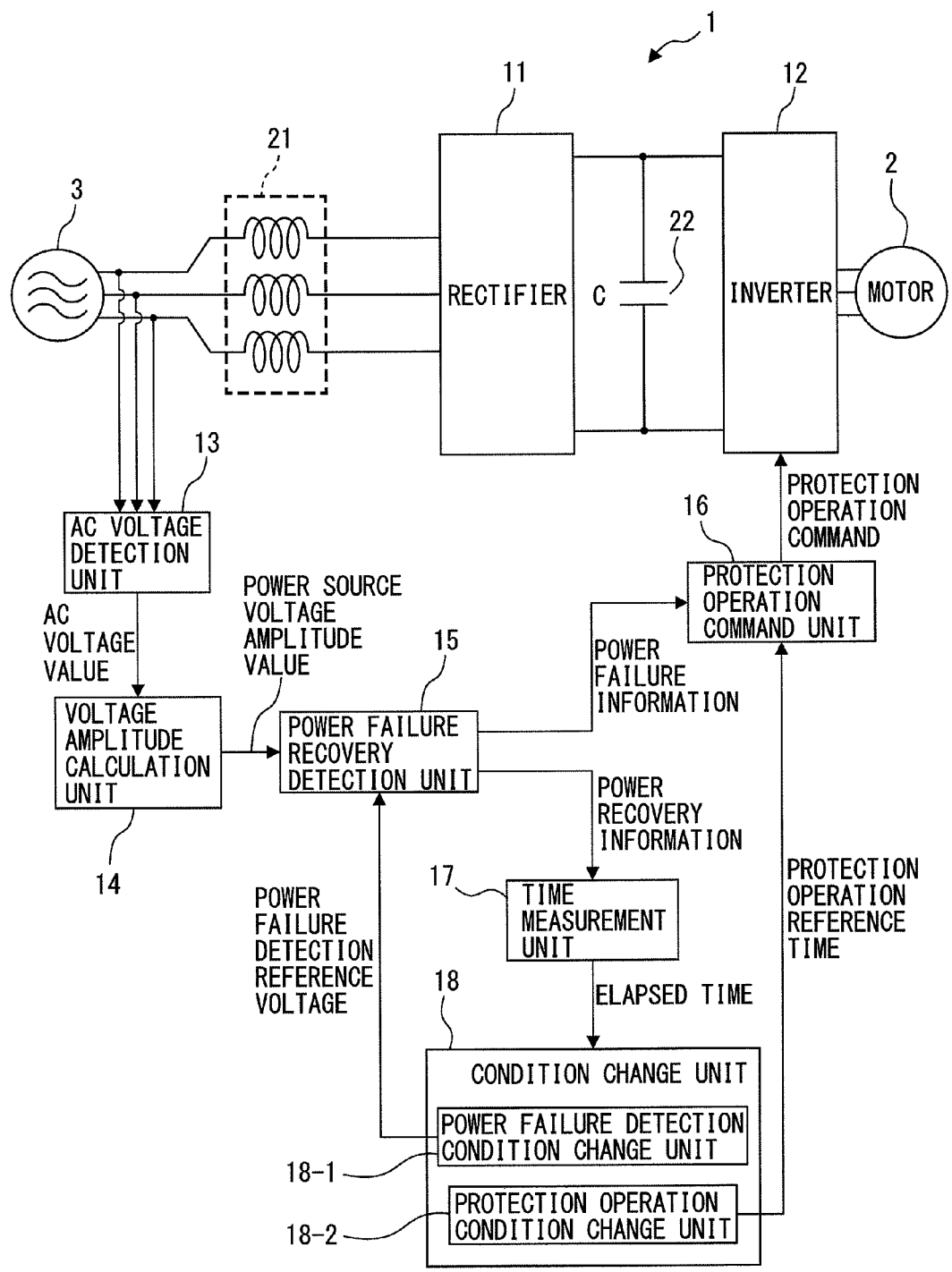
FIG. 1 is a principle block diagram of a motor control apparatus according to an embodiment.

FIG. 1 is a principle block diagram of the motor control apparatus according to the embodiment. According to the present embodiment, a three-phase AC input power source 3 is connected to a three-phase AC input side of a motor control apparatus 1, and a three-phase motor 2 is connected to an AC motor side of the motor control apparatus 1. Although the motor control apparatus 1 which drives and controls a single motor 2 is described here, the present invention is not particularly limited by the number of the motors 2 to be driven and controlled, and can be applied to a motor control apparatus which drives and controls a plurality of motors 2. Further, a type of the motor 2 driven by the motor control apparatus does not particularly limit the present invention, and it may be, for example, an induction motor or a synchronous motor.

The motor control apparatus 1 according to the embodiment includes a rectifier 11, an inverter 12, an AC voltage detection unit 13, a voltage amplitude calculation unit 14, a power failure recovery detection unit 15, a protection operation command unit 16, a time measurement unit 17, and a condition change unit 18. A smoothing capacitor 22 is provided on a DC link which is a DC output side of the rectifier 11.

The rectifier 11 rectifies AC power supplied from the three-phase AC input side on which a commercial three-phase AC input power source 3 exists and outputs DC power to the DC link on the DC output side of the rectifier 11. According to the present invention, an embodiment of the rectifier 11 to be used is not particularly limited, and may be, for example, a three-phase full wave rectifier circuit with a 120-degree conduction regeneration function or a pulse width modulation (PWM) control type rectifier circuit. An AC reactor 21 is connected to the three-phase AC input side of the rectifier 11.

The rectifier 11 is connected to the inverter 12 via the DC link. The inverter 12 can bidirectionally convert power between the DC power of the DC link and the AC power which is drive power or regenerative power of the motor 2. The inverter 12 is configured as a conversion circuit including a switching element therein such as a PWM inverter. The inverter 12 converts the DC power supplied from the DC link side into three-phase AC power of a desired voltage and a desired frequency for driving the motor 2 by making the switching element therein perform a switching operation based on a motor drive command received from a high-order control apparatus (not illustrated). The motor 2 is operated based on the supplied three-phase AC power of a variable voltage and a variable frequency. Further, regenerative power is generated when the motor 2 is braked, and the AC power as the regenerative power generated in the motor 2 is converted into the DC power and returned to the DC link based on the motor drive command received from the high-order control apparatus. When the motor control apparatus 1 drives and controls a plurality of motors 2, the same number of inverters 12 as that of the motors 2 are connected in parallel in order to individually supply drive power to each motor 2 to drive and control the motor 2.

The smoothing capacitor 22 is provided on the DC link which connects the DC side of the rectifier 11 and the DC side of the inverter 12. The smoothing capacitor 22 has a function of reducing ripples of the AC output of the rectifier 11 or the inverter 12 and also a function of temporarily storing the DC power output from the rectifier 11 or the inverter 12. The smoothing capacitor 22 is initially charged with the DC power output from the rectifier 11 by an initial charge unit (not illustrated) during a period from the start of the motor control apparatus 1 to the actual start of drive control of the motor 2. In FIG. 1, the example including one inverter 12 is described, but when a plurality of inverters 12, for example, is connected in parallel, the smoothing capacitor 22 are respectively provided on the AC input side of each inverter 12, and therefore, the smoothing capacitors 22 also have a relation of parallel connection.

The AC voltage detection unit 13 detects an AC voltage value of the three-phase AC input side of the rectifier 11. The AC voltage value detected by the AC voltage detection unit 13 is transmitted to the voltage amplitude calculation unit 14.

Figure 2:
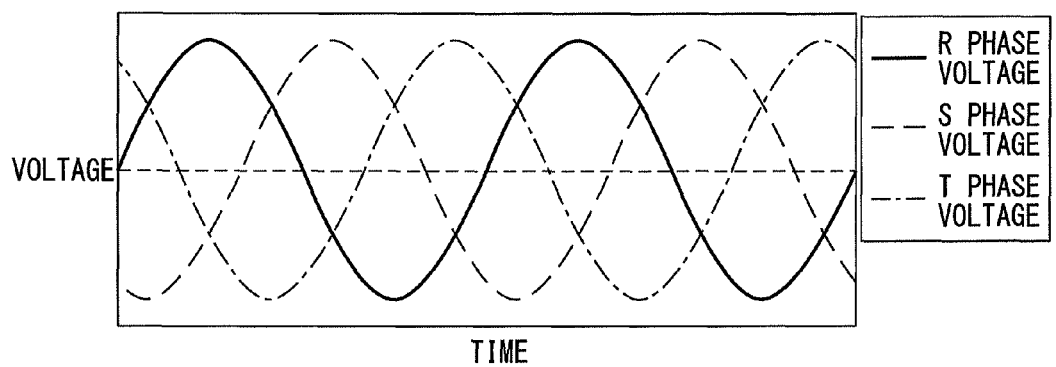
FIG. 2 illustrates three-phase AC voltages.
Figure 3A:
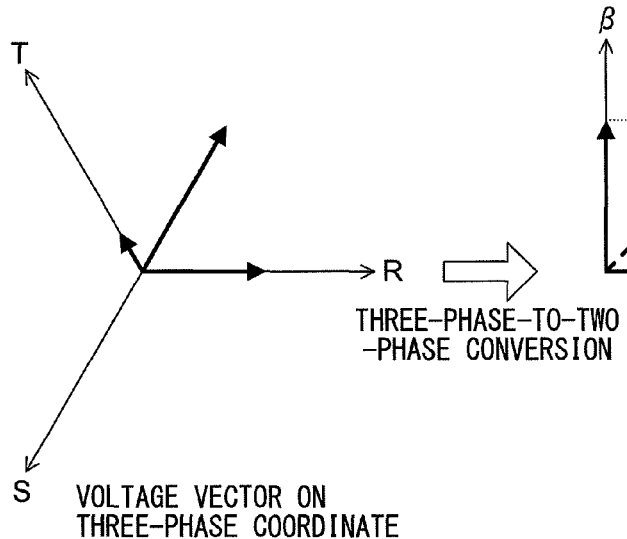
FIG. 3A and FIG. 3B illustrate three-phase-to-two-phase conversion.
Figure 3B:
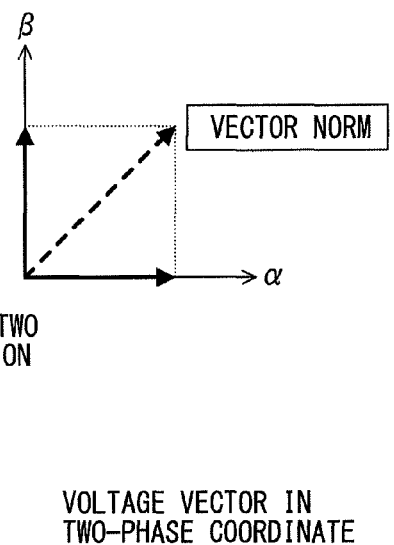

The voltage amplitude calculation unit 14 calculates a power source voltage amplitude value from the AC voltage value. The power source voltage amplitude value calculated by the voltage amplitude calculation unit 14 is transmitted to the power failure recovery detection unit 15. The power source voltage amplitude value is calculated, for example, as a vector norm in a two-phase coordinate which is obtained by performing three-phase-to-two-phase conversion of an AC voltage value in a three-phase coordinate. FIG. 2 illustrates three-phase AC voltages, and FIG. 3A and FIG. 3B illustrate three-phase-to-two-phase conversion. The AC voltages of RST three phases as illustrated in FIG. 2 are expressed as voltage vectors as illustrated in FIG. 3A in the three-phase coordinate. When the voltage vectors on the three-phase coordinate are subjected to the three-phase-to-two-phase conversion, voltage vectors in the two-phase coordinate as illustrated in FIG. 3B are obtained, and a vector norm thereof is used as a power source voltage amplitude value. In the illustrated example, $\alpha\beta$ conversion is used as the three-phase-to-two-phase conversion, however, dq conversion may be used. According to the present embodiment, the voltage amplitude calculation unit 14 calculates a vector norm as the power source voltage amplitude value, however, as an alternative example, the voltage amplitude calculation unit 14 may calculate a voltage peak value of the AC voltage value detected by the AC voltage detection unit 13 and outputs the voltage peak value as the voltage amplitude value.

Again, as described in FIG. 1, the power failure recovery detection unit 15 determines that the three-phase AC input side of the rectifier 11 has transitioned from a power recovery state to a power failure state when the power source voltage amplitude value calculated by the voltage amplitude calculation unit 14 becomes "a value less than or equal to the power failure detection reference voltage value" from "a value greater than a power failure detection reference voltage value" in the power recovery state, and determines that the three-phase AC input side of the rectifier 11 has transitioned from the power failure state to the power recovery state when the power source voltage amplitude value calculated by the voltage amplitude calculation unit 14 becomes "a value greater than or equal to the power recovery detection reference voltage value" from "a value less than the power recovery detection reference voltage value" in the power failure state.

A first specified voltage value specified in advance is set as the power failure detection reference voltage value in normal times. Thus, in normal times, the power failure recovery detection unit 15 determines that the three-phase AC input side of the rectifier 11 has transitioned from the power recovery state to the power failure state when the power source voltage amplitude value becomes a value less than or equal to the first specified voltage value from a value greater than the first specified voltage value. The first specified voltage value may be set in advance in response to the instantaneous power failure tolerance which is the energy amount enabling the motor control apparatus and the peripheral devices thereof (e.g. the control power source unit and the coolant device) to continue the normal operations when the instantaneous power failure occurs. Although the details will be described below, when the three-phase AC input side satisfies a predetermined condition after transition from the power recovery state to the power failure state, the power failure detection reference voltage value is changed to "a second specified voltage value" which is greater than the first specified voltage value and less than the power recovery detection reference voltage value.

As described above, the power failure recovery detection unit 15 determines that the power recovery state has transitioned to the power failure state when the power source voltage amplitude value becomes the value less than or equal to the first specified voltage value from the value greater than the first specified voltage value, but if the relevant power failure is the instantaneous power failure, the power source voltage amplitude value will start increasing immediately. The power source voltage amplitude value increases and exceeds the first specified voltage value again, and then reaches "a voltage enabling the motor 2 to continue the normal operation". According to the present embodiment, a time point at which the power source voltage amplitude value reaches the voltage enabling the motor 2 to continue the normal operation is regarded as a time point at which the three-phase AC input side transitioned from the power failure state to the power recovery state. Thus, according to the present embodiment, the above-described "voltage enabling the motor 2 to continue the normal operation" which is greater than the first specified voltage value is set in advance as the power recovery detection reference voltage value. The power failure recovery detection unit 15 determines whether the three-phase AC input side has transitioned from the power failure state to the power recovery state based on whether the power source voltage amplitude value becomes the value greater than or equal to the power recovery detection reference voltage from the value less than the power recovery detection reference voltage value. A time point at which the power source voltage amplitude value became the value greater than or equal to the power recovery detection reference voltage from the value less than the power recovery detection reference voltage value is regarded as a time point at which the three-phase AC input side transitioned from the power failure state to the power recovery state, and the time measurement unit 17 described below measures an elapsed time from the relevant time point.

Figure 4:
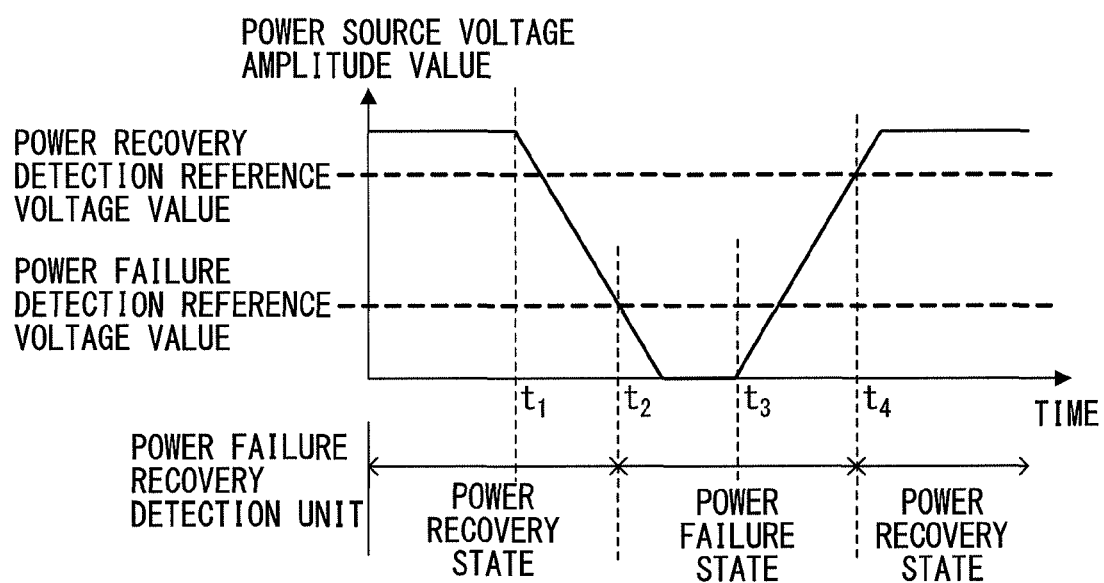
FIG. 4 illustrates an operation of a power failure recovery detection unit in the motor control apparatus according to the embodiment.

A specific example of an operation of the above-described power failure recovery detection unit 15 is described with reference to FIG. 4. FIG. 4 illustrates an operation of the power failure recovery detection unit in the motor control apparatus according to the embodiment. As illustrated in FIG. 4, in the power recovery state, the power source voltage amplitude value calculated by the voltage amplitude calculation unit 14 starts decreasing at a time t1, and when the power source voltage amplitude value becomes the value less than or equal to the power failure detection reference voltage value from the value greater than the power failure detection reference voltage value (i.e., when the continuously decreasing power source voltage amplitude value falls below the power failure detection reference voltage value) at a time t2, the power failure recovery detection unit 15 determines that the three-phase AC input side of the rectifier 11 has transitioned from the power recovery state to the power failure state. As the power failure detection reference voltage value, either of the first specified voltage value or the second specified voltage value is set. After transition to the power failure state, the power source voltage amplitude value starts increasing, for example, at a time t3, and when the power source voltage amplitude value becomes the value greater than or equal to the power recovery detection reference voltage from the value less than the power recovery detection reference voltage value (i.e., when the continuously increasing power source voltage amplitude value exceeds the power recovery detection reference voltage value) at a time t4, the power failure recovery detection unit 15 determines that the three-phase AC input side of the rectifier 11 has transitioned from the power failure state to the power recovery state. The below-described time measurement unit 17 measures an elapsed time from the time t4 at which the power source voltage amplitude value exceeds the power recovery detection reference voltage.

Again, as described in FIG. 1, the protection operation command unit 16 outputs a protection operation command to the inverter 12 to output power for the motor 2 to perform a predetermined protection operation when a protection operation reference time elapsed from the time point at which the power failure recovery detection unit 15 determined that the three-phase AC input side of the rectifier 11 has transitioned from the power recovery state to the power failure state. When power failure occurs on the three-phase AC input side, energy is not supplied from the three-phase AC input side to the DC link via the rectifier 11, but the DC power stored in the smoothing capacitor 22 is converted into the AC power and supplied to the motor 2 by a power conversion operation of the inverter 12 based on the protection operation command. The motor 2 rotates based on the supplied the AC power, and the protection operation is performed such as retreat and stop of a tool and a machining target coupled to the motor 2. As described above, when the protection operation reference time elapsed from the time point at which the power failure recovery detection unit 15 determined that the three-phase AC input side of the rectifier 11 had transitioned from the power recovery state to the power failure state, the protection operation command unit 16 outputs the protection operation command to the inverter 12, and accordingly, various protection operations are started to protect the tool connected to the motor, the machining target machined by the tool, the manufacturing line including the motor control apparatus, and the like.

The time measurement unit 17 has a time measurement function of measuring an elapsed time from a time point at which the power failure recovery detection unit 15 determines that the three-phase AC input side of the rectifier 11 has transitioned from the power failure state to the power recovery state. More specifically, when the power failure recovery detection unit 15 determines that the power source voltage amplitude value exceeded "the power recovery detection reference voltage value greater than the first specified voltage value used as the power failure detection reference voltage value", in other words, the power source voltage amplitude value has become "the value greater than or equal to the power recovery detection reference voltage value" from "the value less than the power recovery detection reference voltage value" in the power failure state, the time measurement unit 17 measures an elapsed time from a time point at which the power source voltage amplitude value exceeds the power recovery detection reference voltage value. The time measurement unit 17 includes a count-up timer and measures the elapsed time from the time point at which the power failure state is determined to have transitioned to the power recovery state by counting up the timer, and the operation is described in detail below.

The condition change unit 18 changes at least one of the power failure detection reference voltage value as the power failure determination condition and the protection operation reference time as a determination condition for starting the protection operation in response to the elapsed time measured by the time measurement unit 17. According to the present embodiment, the condition change unit 18 includes both a power failure detection condition change unit 18-1 and a protection operation condition change unit 18-2, but as described below, the condition change unit 18 may be configured to include only either of the power failure detection condition change unit 18-1 or the protection operation condition change unit 18-2.

The power failure detection condition change unit 18-1 in the condition change unit 18 changes power failure detection sensitivity of the power failure recovery detection unit 15 in response to the elapsed time measured by the time measurement unit 17. In other words, when the elapsed time measured by the time measurement unit 17 is less than a condition change reference time, the power failure detection condition change unit 18-1 changes the power failure detection reference voltage value from the first specified voltage value already used as the power failure detection reference voltage value to the second specified voltage value which is greater than the first specified voltage value and less than the power recovery detection reference voltage value. Further, when the elapsed time measured by the time measurement unit 17 becomes greater than or equal to the condition change reference time, the power failure detection condition change unit 18-1 changes the power failure detection reference voltage value from the second specified voltage value to the first specified voltage value.

On the other hand, the protection operation condition change unit 18-2 in the condition change unit 18 changes a timing of the protection operation command unit 16 for outputting the protection operation command in response to the elapsed time measured by the time measurement unit 17. In other words, when the elapsed time measured by the time measurement unit 17 is less than the condition change reference time, the protection operation condition change unit 18-2 changes the protection operation reference time from the first specified time already used as the protection operation reference time to a second specified time which is shorter than a first specified time. Further, when the elapsed time measured by the time measurement unit 17 becomes greater than or equal to the condition change reference time, the protection operation condition change unit 18-2 changes the protection operation reference time from the second specified time to the first specified time.

When the power failure detection reference voltage value is changed to the second specified voltage value greater than the first specified voltage value by the power failure detection condition change unit 18-1, a timing at which the power failure recovery detection unit 15 determines that "the power source voltage amplitude value has become the value less than the second specified voltage value from the value greater than the second specified voltage value" becomes earlier compared to a timing at which the power failure recovery detection unit 15 determines that "the power source voltage amplitude value has become the value less than the first specified voltage value from the value greater than the first specified voltage value", so that the power failure detection sensitivity of the power failure recovery detection unit 15 is increased. Further, when the protection operation reference time is changed to the second specified time shorter than the first specified time by the protection operation condition change unit 18-2, an output timing of the protection operation command becomes earlier, and the protection operation is started at an earlier timing. A reason why the power failure detection sensitivity and the output timing of the protection operation command are changed in response to the elapsed time from the time point at which the three-phase AC input side transitioned from the power failure state to the power recovery state (i.e., the time point at which the power source voltage amplitude value exceeds the power recovery detection reference voltage value) is as follows.

As described above, the motor control apparatus and the peripheral devices thereof are respectively provided with the energy storage units for storing energy enabling the respective devices to continue the normal operation, and according to the present embodiment, the condition change reference time is set in response to a time length for storing the energy in the energy storage unit. Generally, the energy stored in the energy storage unit is supplied from the three-phase AC input side, but when an instantaneous power failure occurs on the three-phase AC input side, energy supply to the energy storage unit is once interrupted. As the three-phase AC input side is then recovered from the instantaneous power failure, the energy supply from the three-phase AC input side is resumed at the power recovery time point. When the instantaneous power failure successively occurs, interruption and resumption of the energy supply to the energy storage unit are repeated, but if the motor control apparatus and the peripheral devices thereof continue the normal operation without change, the energy in the energy storage unit is gradually decreased. When large-scale power failure occurs at this time, there is a possibility that a situation may be caused in which the energy for performing the protection operation is not able to be secured because of lack of energy in the energy storage. Thus, according to the present embodiment, the time measurement unit 17 measures the elapsed time from the time point at which the three-phase AC input side transitioned from the power failure state to the power recovery state (i.e., when the power source voltage amplitude value increases and exceeds the power recovery detection reference voltage value), and the power failure detection sensitivity and the output timing of the protection operation command are differentiated according to whether the elapsed time measured by the time measurement unit 17 is less than or not less than the condition change reference time, so that a situation can be avoided in which the energy for performing the protection operation is not able to be secured because of the lack of energy. Specifically, when the elapsed time measured by the time measurement unit 17 is less than the condition change reference time, the power failure detection condition change unit 18-1 sets the second specified voltage value greater than the first specified voltage value as a new power failure detection reference voltage value instead of the first specified voltage value already used as the power failure detection reference voltage value considering that it is highly likely that the energy storage unit does not store the energy enabling the motor control apparatus and the peripheral devices thereof to perform the protection operation. Accordingly, the power failure detection sensitivity is increased so as to be able to more quickly detect power failure occurring during a period less than the condition change reference time and secure at least energy for performing the protection operation at the time of the power failure. In addition, the protection operation condition change unit 18-2 sets the second specified time shorter than the first specified time as a new protection operation reference time instead of the first specified time already used as the protection operation reference time, and accordingly, the output timing of the protection operation command is set ahead so as to be able to start the protection operation in a stage in which decrease of the energy stored in the energy storage unit is still small even when the power failure occurs during a period less than the condition change reference time. As described above, according to the present invention, since the power failure detection condition change unit 18-1 and the protection operation condition change unit 18-2 are provided, a situation can be avoided in which the energy for performing the protection operation is not able to be secured because of the lack of energy, and accordingly, the protection operation can be performed. Energy consumed by the motor control apparatus and the peripheral devices thereof to perform the protection operation is different depending on the device, so that the condition change reference time may be set in consideration of time it takes for the energy storage unit corresponding to a device which consumes the most energy for performing the protection operation among the devices to store energy necessary for the protection operation of the relevant device.

According to the present embodiment, the condition change unit 18 is configured to include both of the power failure detection condition change unit 18-1 and the protection operation condition change unit 18-2, but when the condition change unit 18 is configured to include only either of the power failure detection condition change unit 18-1 or the protection operation condition change unit 18-2, a similar effect is also produced. A user may appropriately determine whether to configure the condition change unit 18 by the power failure detection condition change unit 18-1 only, the protection operation condition change unit 18-2 only, or both of the power failure detection condition change unit 18-1 and the protection operation condition change unit 18-2 as necessary.

The second specified voltage value set by the power failure detection condition change unit 18-1 when the elapsed time measured by the time measurement unit 17 is less than the condition change reference time is transmitted to the power failure recovery detection unit 15. Accordingly, the power failure recovery detection unit 15 uses the second specified voltage value as a power failure determination reference voltage to determine presence or absence of power failure on the three-phase AC input side of the rectifier 11. In other words, during a period from when the three-phase AC input side transitioned from the power failure state to the power recovery state (i.e., when the power source voltage amplitude value increases and exceeds the power recovery detection reference voltage value) to when the condition change reference time is reached (i.e., when the condition change reference time elapsed), the power failure recovery detection unit 15 determines presence or absence of power failure on the three-phase AC input side of the rectifier 11 under the power failure determination condition with higher power failure detection sensitivity. When the elapsed time measured by the time measurement unit 17 then becomes greater than or equal to the condition change reference time, the power failure detection condition change unit 18-1 restores the power failure detection reference voltage value from the second specified voltage value to the first specified voltage value and transmits that effect to the power failure recovery detection unit 15, so that the power failure recovery detection unit 15 determines presence or absence of power failure on the three-phase AC input side of the rectifier 11 using the first specified voltage value as the power failure determination reference voltage.

Further, the second specified time set by the protection operation condition change unit 18-2 when the elapsed time measured by the time measurement unit 17 is less than the condition change reference time is transmitted to the protection operation command unit 16. Accordingly, the protection operation command unit 16 determines whether or not to output the protection operation command using the second specified time as the protection operation reference time. In other words, during a period from when the three-phase AC input side transitioned from the power failure state to the power recovery state (i.e., when the power source voltage amplitude value exceeds the power recovery detection reference voltage value) to when the condition change reference time is reached, the protection operation is started at an earlier timing. When the elapsed time measured by the time measurement unit 17 then becomes greater than or equal to the condition change reference time, the protection operation condition change unit 18-2 restores the protection operation reference time from the second specified time to the first specified time and transmits that effect to the protection operation command unit 16, so that the protection operation command unit 16 determines whether or not to output the protection operation command using the first specified time as the protection operation reference time.

Figure 5:
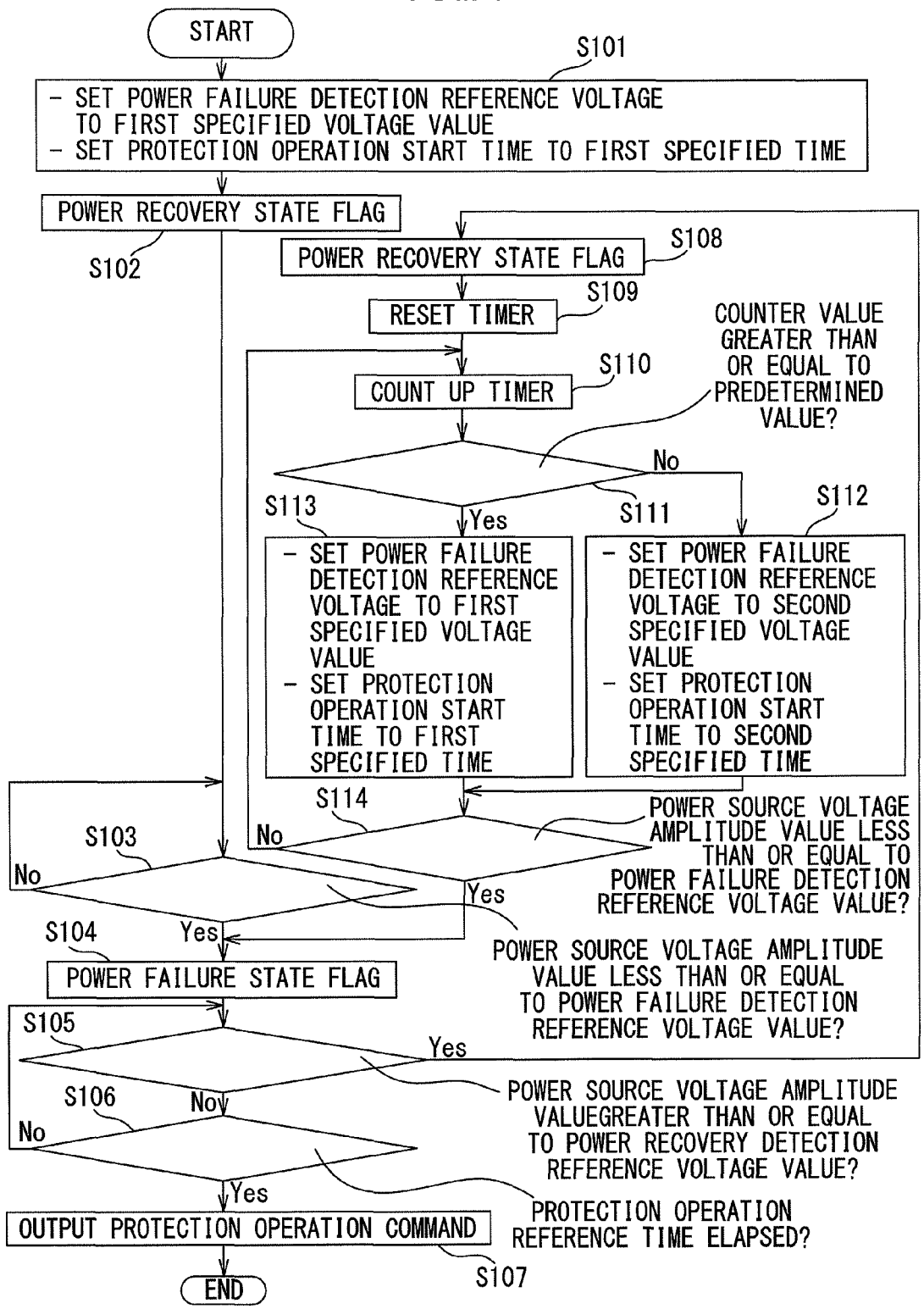
FIG. 5 is a flowchart illustrating an operation of the motor control apparatus illustrated in FIG. 1.
Figure 6:
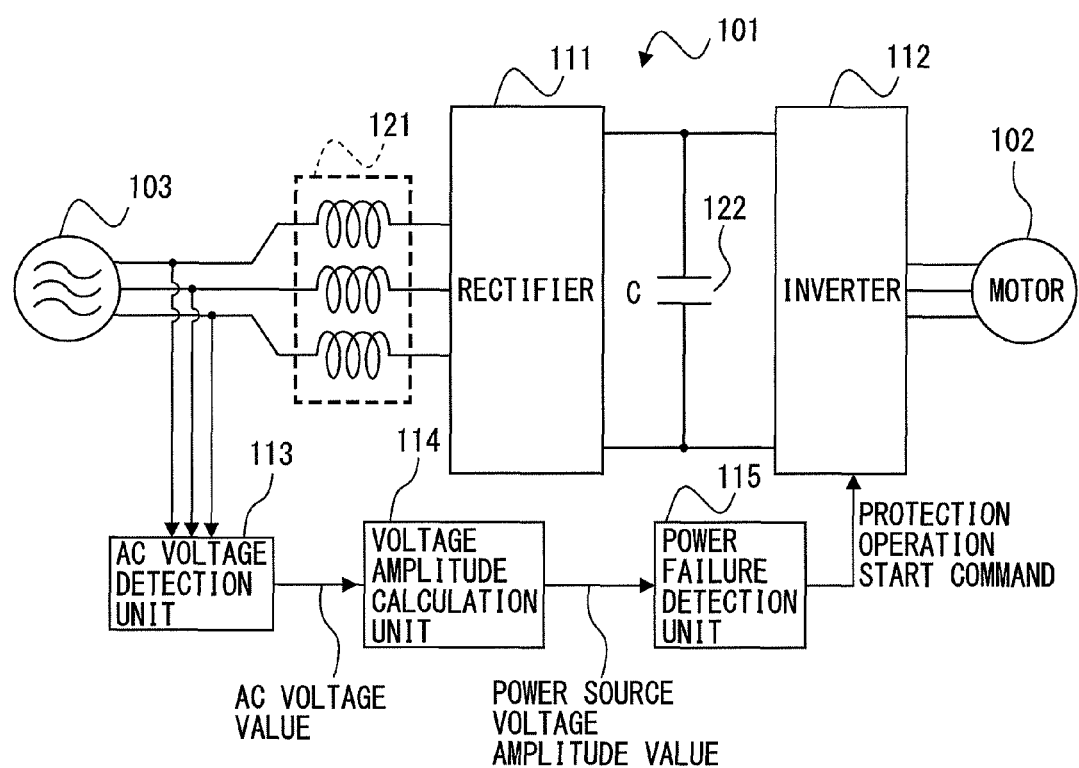
FIG. 6 illustrates a power failure detection method according to the invention described in Japanese Unexamined Patent Publication No. 2006-14546.

FIG. 5 is a flowchart illustrating an operation of the motor control apparatus illustrated in FIG. 1. In FIG. 5, detection of the AC voltage value of the three-phase AC input side of the rectifier 11 by the AC voltage detection unit 13 and calculation of the power source voltage amplitude value by the voltage amplitude calculation unit 14 are omitted from the illustration.

According to the present embodiment, in the motor control apparatus 1, whether the three-phase AC input side of the rectifier 11 is in the power recovery state or in the power failure state is recognized by, for example, storing a power recovery state flag or a power failure state flag in a predetermined memory (not illustrated) in the apparatus. In other words, when the motor control apparatus 1 stores the power recovery state flag, the three-phase AC input side of the rectifier 11 is in the power recovery state as a normal state in which power failure does not occur, and when the motor control apparatus 1 stores the power failure state flag, the three-phase AC input side of the rectifier 11 is in the power failure state in which power failure has occurred.

As an initial state, a case is considered in which the three-phase AC input side of the rectifier 11 is in the power recovery state as the normal state in which power failure does not occur, the first specified voltage value is set as the power failure detection reference voltage value in the normal time, and the first specified time is set as the protection operation reference time in normal times.

In step S101, the first specified voltage value is set as the power failure detection reference voltage value, and the first specified time is set as the protection operation reference time.

In step S102, the motor control apparatus 1 stores the power recovery state flag.

Next, in step S103, the power failure recovery detection unit 15 determines whether the power source voltage amplitude value calculated by the voltage amplitude calculation unit 14 has become the value less than or equal to the power failure detection reference voltage value from the value greater than the power failure detection reference voltage value. The first specified voltage value is set as the power failure detection reference voltage value in step S101. Therefore, as an operation in normal times when power failure does not yet occur, the power failure recovery detection unit 15 determines whether the power source voltage amplitude value has become the value less than or equal to the first specified voltage value from the value greater than the first specified voltage value.

When the power source voltage amplitude value calculated by the voltage amplitude calculation unit 14 became the value less than or equal to the power failure detection reference voltage value (the first specified voltage value) from the value greater than the power failure detection reference voltage value (the first specified voltage value), the power failure recovery detection unit 15 determines that the three-phase AC input side of the rectifier 11 has transitioned from the power recovery state to the power failure state, and the processing proceeds to step S104. In step S104, the motor control apparatus 1 switches the stored flag from the power recovery state flag to the power failure state flag.

In step S105, the power failure recovery detection unit 15 determines whether the power source voltage amplitude value calculated by the voltage amplitude calculation unit 14 has become the value greater than or equal to the power recovery detection reference voltage value from the value less than the power recovery detection reference voltage value in the power failure state.

When the power source voltage amplitude value calculated by the voltage amplitude calculation unit 14 does not become the value greater than or equal to the power recovery detection reference voltage value from the value less than the power recovery detection reference voltage value (i.e., the power source voltage amplitude value remains less than the power recovery detection reference voltage value), the processing proceeds to step S106. On the other hand, when it is determined that the power source voltage amplitude value calculated by the voltage amplitude calculation unit 14 has become the value greater than or equal to the power recovery detection reference voltage value from the value less than the power recovery detection reference voltage value, the processing proceeds to step S108.

In step S106, the protection operation command unit 16 determines whether the protection operation reference time has elapsed from a time point at which the power failure recovery detection unit 15 determined that the three-phase AC input side of the rectifier 11 had transitioned from the power recovery state to the power failure state. As the protection operation reference time, the first specified time is set in the normal time, and thus, the protection operation command unit 16 determines whether the first specified time has elapsed from the time point at which the power failure recovery detection unit 15 determined that the three-phase AC input side of the rectifier 11 had transitioned from the power recovery state to the power failure state in normal times. As described below, when the protection operation reference time is changed from the first specified time to the second specified time by the protection operation condition change unit 18-2 in the condition change unit 18, the protection operation command unit 16 determines whether the second specified time has elapsed from the time point at which the power failure recovery detection unit 15 determined that the three-phase AC input side of the rectifier 11 had transitioned from the power recovery state to the power failure state.

In step S106, when the protection operation command unit 16 determines that the protection operation reference time has not elapsed, the processing returns to step S105, and when the protection operation command unit 16 determines that the protection operation reference time has elapsed, the processing proceeds to step S107.

In step S107, the protection operation command is output to the inverter 12 to output power for the motor 2 to perform the predetermined protection operation. Accordingly, the inverter 12 converts the DC power stored in the smoothing capacitor 22 into the AC power based on the protection operation command and supplies the AC power to the motor 2. The motor 2 rotates based on the supplied the AC power, and the protection operation is performed such as retreat and stop of the tool and the machining target coupled to the motor 2. Accordingly, various protection operations are started to protect the tool connected to the motor, the machining target machined by the tool, the manufacturing line including the motor control apparatus, and the like.

According to the processing in steps S105 to S107, when the three-phase AC input side of the rectifier 11 is in the power failure state, the protection operation is not started until the protection operation reference time elapsed, and the protection operation is started after the elapse of the protection operation reference time. For example, when the power is recovered without determination that the protection operation reference time has not elapsed (i.e., without the protection operation performed) in step S106, it is determined that the power source voltage amplitude value becomes the value less than or equal to the power failure detection reference voltage value from the value greater than the power failure detection reference voltage value in step S103 and that the power source voltage amplitude value becomes the value greater than or equal to the power recovery detection reference voltage value from the value less than the power recovery detection reference voltage value in step S105, and an instantaneous power failure corresponds to this case.

On the other hand, in step S105, when it is determined that the power source voltage amplitude value calculated by the voltage amplitude calculation unit 14 has become the value greater than or equal to the power recovery detection reference voltage value from the value less than the power recovery detection reference voltage value, the processing proceeds to step S108.

In step S108, the motor control apparatus 1 switches the stored flag from the power failure state flag to the power recovery state flag.

Next, in step S109, the time measurement unit 17 resets the timer and starts measurement of an elapsed time from a time point at which it is determined that the three-phase AC input side of the rectifier 11 has transitioned from the power failure state to the power recovery state. As described below, every time the processing in step S110 is executed, the timer of the time measurement unit 17 is incremented by one, and further the elapsed time from the time point at which it is determined that the power failure state has transitioned to the power recovery state is measured by counting a counter value of the timer by executing the processing in step S111. The processing in step S108 and step S109 may be executed in the reverse order or at the same time.

Next, in step S110, the time measurement unit 17 counts up the timer (i.e., increments by one).

Next, in step S111, the processing by the condition change unit 18 is executed. In other words, the power failure detection condition change unit 18-1 and the protection operation condition change unit 18-2 in the condition change unit 18 determine whether the counted value of the timer has become a predetermined value. The "predetermined value" corresponds to the condition change reference time. In other words, the processing in step S111 is that the condition change unit 18 determines whether the elapsed time measured by the time measurement unit 17 is greater than or equal to the condition change reference time.

In step S111, when it is determined that the counter value of the timer is less than the predetermined value (i.e., when it is determined that the elapsed time measured by the time measurement unit 17 is less than the condition change reference time), the processing proceeds to step S112, and when it is determined that the counter value of the timer is greater than or equal to the predetermined value (i.e., when it is determined that the elapsed time measured by the time measurement unit 17 is greater than or equal to the condition change reference time), the processing proceeds to step S113.

When it is determined that the counter value of the timer is less than the predetermined value in step S111, then in step S112, the power failure detection condition change unit 18-1 newly sets the second specified voltage value greater than the first specified voltage value as the power failure detection reference voltage value, and the protection operation condition change unit 18-2 newly sets the second specified time shorter than the first specified time as the protection operation reference time. After the second specified voltage value was set as the power failure detection reference voltage value by the power failure detection condition change unit 18-1 and the second specified time was set as the protection operation reference time by the protection operation condition change unit 18-2 in step S112, the processing proceeds to step S114.

On the other hand, when it is determined that the counted value of the timer becomes greater than or equal to the predetermined value (i.e., when it is determined that the elapsed time measured by the time measurement unit 17 has become greater than or equal to the condition change reference time) in step S111, then in step S113, the power failure detection condition change unit 18-1 newly sets the first specified voltage value as the power failure detection reference voltage value, and the protection operation condition change unit 18-2 newly sets the first specified time as the protection operation reference time. After executing the processing in step S113, the processing proceeds to step S114.

In step S114, the power failure recovery detection unit 15 determines whether the power source voltage amplitude value calculated by the voltage amplitude calculation unit 14 has become the value less than or equal to the power failure detection reference voltage value from the value greater than the power failure detection reference voltage value. In step S114, when it is determined that the power source voltage amplitude value does not become the value less than or equal to the power failure detection reference voltage value from the value greater than the power failure detection reference voltage value, the processing returns to step S110, and the time measurement unit 17 counts up the timer (i.e., increments by one). On the other hand, in step S114, when it is determined that the power source voltage amplitude value has become the value less than or equal to the power failure detection reference voltage value from the value greater than the power failure detection reference voltage value, the processing returns to step S104. Therefore, as long as it is determined that the counter value of the timer is less than the predetermined value (i.e., it is determined that the elapsed time measured by the time measurement unit 17 is less than the condition change reference time) in step S111, the second specified voltage value is set as the power failure detection reference voltage value and the second specified time is set as the protection operation reference time in step S112, and only after it is determined that the counter value of the timer has become greater than or equal to the predetermined value (i.e., it is determined that the elapsed time measured by the time measurement unit 17 is greater than or equal to the condition change reference time) in step S111, the first specified voltage value is set as the power failure detection reference voltage value and the first specified time is set as the protection operation reference time in step S113. By the processing in step S113, the power failure detection reference voltage value is restored to the first specified voltage value which is the original (i.e., in normal times) the power failure determination condition, and the protection operation reference time is restored to the first specified time which is the original output timing of the protection operation command.

Therefore, in step S114 subsequent to step S112, the power failure recovery detection unit 15 determines whether the power source voltage amplitude value calculated by the voltage amplitude calculation unit 14 has become the value less than or equal to the second specified voltage value as the power failure detection reference voltage value from the value greater than the second specified voltage value as the power failure detection reference voltage value. In other words, the power failure recovery detection unit 15 determines presence or absence of power failure on the three-phase AC input side of the rectifier 11 at the second specified voltage value greater than the first specified voltage value, and accordingly a timing for determining that "the power source voltage amplitude value has become the value less than the second specified voltage value from the value greater than the second specified voltage value" becomes earlier than a timing for determining that "the power source voltage amplitude value has become the value less than the first specified voltage value from the value greater than the first specified voltage value", and the power failure detection sensitivity of the power failure recovery detection unit 15 is increased.

When the processing further proceeds to step S105 after step S114 subsequent to step S112, the protection operation command unit 16 determines whether the second specified time has elapsed from the timing at which the power failure recovery detection unit 15 determined that the three-phase AC input side of the rectifier 11 had transitioned from the power recovery state to the power failure state. In other words, the protection operation command unit 16 determines whether or not to output the protection operation command at the second specified time shorter than the first specified time, so that the output timing of the protection operation command can be set earlier than that in normal times, and the protection operation can be started in a stage in which decrease of the energy stored in the energy storage unit is still small.

On the other hand, in step S114 subsequent to step S113, the power failure recovery detection unit 15 determines presence or absence of power failure on the three-phase AC input side of the rectifier 11 using the first specified voltage value which is the original power failure determination condition. When the processing further proceeds to step S105 after step S114 subsequent to step S113, the protection operation command unit 16 determines whether the first specified time has elapsed which is the original protection operation reference time in step S106.

In the flowchart illustrated in FIG. 5, operations of the motor control apparatus (FIG. 1) including both the power failure detection condition change unit 18-1 and the protection operation condition change unit 18-2 as the condition change unit 18 are described, but when the condition change unit 18 includes only either of the power failure detection condition change unit 18-1 or the protection operation condition change unit 18-2, processing corresponding to the relevant change unit is only executed regarding steps S112 and S113.

As described above, according to the embodiment, for a certain period after recovery from power failure occurred on the three-phase AC input side of the rectifier 11, power failure detection is performed using the higher power failure detection sensitivity and the output timing of the protection operation command is set ahead, so that the protection operation can be started in a stage in which decrease of the energy stored in the energy storage unit is still small even when power failure occurs in a period less than the condition change reference time. Accordingly, a situation can be avoided in which the energy for performing the protection operation is not able to be secured because of the lack of energy, and the protection operation can be performed.

As described above, the present invention can realize the motor control apparatus capable of efficiently and performing the protection operation when power failure occurs on the three-phase AC input side.

What is claimed is:

1. A motor control apparatus comprising:
a rectifier configured to rectify AC power supplied from a three-phase AC input side to output DC power;
an inverter connected to a DC link on a DC output side of the rectifier and configured to convert power between DC power of the DC link and AC power as drive power or regenerative power of a motor;
an AC voltage detection unit configured to detect an AC voltage value on the three-phase AC input side of the rectifier;
a voltage amplitude calculation unit configured to calculate a power source voltage amplitude value from the AC voltage value;
a power failure recovery detection unit configured to determine that the three-phase AC input side of the rectifier has transitioned from the power recovery state to a power failure state when the power source voltage amplitude value becomes a value less than or equal to a power failure detection reference voltage value from a value greater than the power failure detection reference voltage value in a power recovery state, and to determine that the three-phase AC input side of the rectifier has transitioned from the power failure state to the power recovery state when the power source voltage amplitude value becomes a value greater than or equal to a power recovery detection reference voltage from a value less than the power recovery detection reference voltage value in the power failure state;
a protection operation command unit configured to output a protection operation command to the inverter to output power for the motor to perform a predetermined protection operation when a protection operation reference time has elapsed from a time point at which the power failure recovery detection unit determined that the three-phase AC input side of the rectifier had transitioned from the power recovery state to the power failure state;
a time measurement unit configured to measure an elapsed time from a time point at which the power failure recovery detection unit determines that the three-phase AC input side of the rectifier has transitioned from the power failure state to the power recovery state; and
a condition change unit configured to change at least one of the power failure detection reference voltage value and the protection operation reference time in response to the elapsed time.

2. The motor control apparatus according to claim 1, wherein the condition change unit includes a power failure detection condition change unit configured to, when the elapsed time is less than a condition change reference time, change the power failure detection reference voltage value from a first specified voltage value used as the power failure detection reference voltage value, to a second specified voltage value greater than the first specified voltage value and smaller than the power recovery detection reference voltage value, and when the elapsed time becomes greater than or equal to the condition change reference time, change the power failure detection reference voltage value to the first specified voltage value instead of the second specified voltage value.

3. The motor control apparatus according to claim 1, wherein the condition change unit includes a protection operation condition change unit configured to, when the elapsed time is less than the condition change reference time, change the protection operation reference time from a first specified time used as the protection operation reference time, to a second specified time shorter than the first specified time, and when the elapsed time becomes greater than or equal to the condition change reference time, change the protection operation reference time to the first specified time instead of the second specified time.

* * * * *